United States Patent
Östrup et al.

(10) Patent No.: US 9,560,628 B2
(45) Date of Patent: Jan. 31, 2017

(54) METHOD AND NODE FOR PAGING IN A RADIO ACCESS NETWORK

(75) Inventors: Peter Östrup, Linköping (SE); Pontus Sandberg, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/406,547

(22) PCT Filed: Jun. 13, 2012

(86) PCT No.: PCT/SE2012/050641
§ 371 (c)(1),
(2), (4) Date: Dec. 9, 2014

(87) PCT Pub. No.: WO2013/187814
PCT Pub. Date: Dec. 19, 2013

(65) Prior Publication Data
US 2015/0141062 A1  May 21, 2015

(51) Int. Cl.
*H04W 68/00* (2009.01)
*H04W 68/04* (2009.01)
*H04W 68/08* (2009.01)

(52) U.S. Cl.
CPC ........... *H04W 68/005* (2013.01); *H04W 68/04* (2013.01); *H04W 68/08* (2013.01)

(58) Field of Classification Search
CPC .................................................. H04W 72/00
(Continued)

(56) References Cited

U.S. PATENT DOCUMENTS

| 6,738,629 B1 * | 5/2004 | McCormick | H04W 68/00 455/433 |
| 2001/0005681 A1 * | 6/2001 | Kim | H04W 68/00 455/458 |
| 2010/0220680 A1 * | 9/2010 | Ramankutty | H04W 68/08 370/329 |

FOREIGN PATENT DOCUMENTS

| KR | 20110072082 A | 6/2011 |
| WO | 9836603 A2 | 8/1998 |
| WO | 2010071545 A1 | 6/2010 |

OTHER PUBLICATIONS

Koukoutsidis, I. Z. et al., "A Combination of Optimal Partitioning and Location Prediction to Assist Paging in Mobile Cellular Networks", International Journal of Wireless Information Networks, vol. 11, No. 3, Jul. 2004, 123-129.

(Continued)

*Primary Examiner* — Martin Mushambo
(74) *Attorney, Agent, or Firm* — Patent Portfolio Builders, PLLC

(57) ABSTRACT

The present invention relates to a method in the radio access node for paging user equipment attached to a radio network. The steps performed by the radio access node include receiving (31) a core network paging message from a core network. A request for paging of the user equipment in a set of neighboring radio access nodes using paging level information in the core network paging message is identified (32), wherein the paging level information may include information that an escalated page is to be performed. A radio access node paging instruction is generated (33) in the radio access node receiving the paging message; the paging instruction including an escalated page instruction. The paging instruction is sent (34) to the set of neighboring radio access nodes, whereupon a page is initiated in at least one cell of each neighboring radio access node. The invention (Continued)

also relates to a radio access node configured to perform the inventive method.

15 Claims, 4 Drawing Sheets

(58) Field of Classification Search
USPC .............................. 455/458, 456.1; 370/312
See application file for complete search history.

(56) References Cited

OTHER PUBLICATIONS

Unknown, Author, "The paging solution considering different service types", Huawei, 3GPP TSG RAN WG3 Meeting #51bis, R3-060427, Sophia Antipolis, France, Apr. 3-5, 2006, 1-3.

* cited by examiner

METHOD AND NODE FOR PAGING IN A RADIO ACCESS NETWORK

TECHNICAL FIELD

The present invention relates to a method in a radio access node in a radio access network for an enhanced paging procedure in the paging of user equipment attached to the network. The present invention also relates to a radio access node configured to perform the enhanced paging procedure.

BACKGROUND

In a typical cellular radio system, wireless terminals communicate via a radio access network, RAN, with one or more core networks. The wireless terminals can be mobile stations or other types of user equipment, UE, such as portable, pocket, hand-held, computer-included, or car-mounted mobile devices which communicate voice and/or data with radio access network, e.g., mobile telephones and laptops with wireless capability.

The RAN covers a geographical area which is divided into cell areas, with each cell area or group of cell areas being served by a radio access node. A cell is a geographical area where radio coverage is provided by equipment at the radio access node. Each cell is identified by an identity within the local radio area. The radio access nodes communicate over the air interface with the UE within the cells served by the node.

The Universal Mobile Telecommunications System, UMTS, is a third generation mobile communication system, which evolved from the Global System for Mobile Communications, GSM, and is intended to provide improved mobile communication services based on Wideband Code Division Multiple Access, WCDMA, access technology. UTRAN is essentially a radio access network using wideband code division multiple access for user equipment units, UEs. The Third Generation Partnership Project, 3 GPP, has undertaken to evolve further the UTRAN and GSM based radio access network technologies. Specifications for the Evolved Universal Terrestrial Radio Access Network, E-UTRAN, are ongoing within the 3GPP. Another name used for E-UTRAN is the Long Term Evolution, LTE, Radio Access Network, RAN.

Long Term Evolution RAN is a 3GPP radio access technology wherein a flat architecture is used with a singled type of nodes connected directly to a core network. The LTE RAN comprises evolved radio access nodes, e.g., evolved NodeBs or eNodeBs or eNBs, providing evolved UTRA user-plane and control-plane protocol terminations toward the User Equipment, UE. The eNodeB is a logical node and not a physical implementation. A common implementation of an eNodeB is a three-sector site, where the eNodeB includes equipment for handling transmissions in three cells. However, other implementations can be found as well. The eNodeB hosts functions for radio resource management, mobility management and user plane functions, among others. The X2 interface connects eNodeBs to each other.

The eNodeB is connected to the core-network by means of the S1 interface. One eNodeB can be connected to multiple Mobility Management Entities. A Mobility Management Entity, MME, is the core network node responsible for mobility management, e.g., UE tracking and paging procedures.

Paging is used for network-initiated connection setup when the UE is in a Radio Resource Control idle mode, RRC_IDLE. In idle mode, the UE does not belong to a specific cell. No data transfer may take place as the UE is in idle mode, RRC_IDLE, most of the time in order to reduce battery consumption. User Equipment, UE, in the RRC_IDLE is periodically enabled to receive paging messages from the network.

Each time a UE attaches to the network, it also performs a Tracking Area Update, TAU, procedure and registers in a certain Tracking Area, TA. The Tracking Area represents a group of cells, preferably adjacent. Each eNodeB may handle radio transmission in cells belonging to different tracking areas. A Tracking Area List represents a group of Tracking Areas, thus including a higher number of cells than the Tracking Area. In response to the registration, the UE receives a Tracking Area List from the network and as long as the UE is present in one of the Tracking Areas within the Tracking Area List it does not have to perform a new TAU procedure.

In LTE, the mechanism for downlink data transmission on the Downlink Shared Channel, DL-SCH, is used for paging. The UE monitors control signaling for downlink scheduling assignments related to paging. The location of the UE in Idle Mode is not known on a cell level; thus, the paging message is typically transmitted across multiple cells. The MME initiates the paging procedure by sending a paging message to one or more eNodeBs. In LTE, an S1 paging message is sent from the MME to the eNodeB to request paging of a certain UE. In present LTE system, paging is escalated from an eNodeB level, to a Tracking Area, TA, level and finally to a Tracking Area List level.

The tracking area is controlled by the MME. Typically, the eNodeB in which the MME knows the UE to have been present last is first asked to perform the paging procedure (in all configured cells) a number of times. If no page response is received, the eNodeBs are secondly asked to perform the paging procedure in cells of the eNodeBs belonging to a Tracking Area, and last the eNodeBs are asked to perform the paging procedure in cells of the eNodeBs belonging to the Tracking Area List. However, if a TA is extensive, escalating from eNodeB level to Tracking Area level could imply an escalation from one eNodeB up to 100 eNodeBs or more involved in the page of one User Equipment, UE. Such escalation will incur a high paging load on the radio access network.

What is needed therefore, and an object of the technology described herein, is to provide solutions that reduces paging load in the network during an escalated paging procedure.

SUMMARY

It is an object of embodiments of the invention to reduce paging load in a wireless communication network whilst reducing the time from an initiated paging procedure to a paging response.

Such an object may be achieved by a method in a radio access node in a radio access network, for paging user equipment in the network.

In an embodiment of a method in the radio access node for paging a user equipment attached to a radio network, the steps performed by the radio access node includes receiving a core network paging message from a core network, A request for paging of the user equipment in a set of neighboring radio access node using paging level information in the core network paging message is identified, wherein the paging level information may include information that an escalated page is to be performed. A radio access node paging instruction is generated in the radio access node receiving the paging message; the paging instruction including an escalated page instruction. The paging instruction is sent to the set of neighboring radio access nodes, whereupon a page is initiated in at least one cell of each neighboring radio access node.

In a further embodiment of the invention, the radio access node is an eNodeB in a LTE network and signaling between the radio access node and the core network is performed over the S1 interface whilst signaling between the radio access node and neighboring radio access nodes is performed over the X2 interface.

Embodiments of the invention also relate to a radio access node configured to perform embodiments of the inventive method.

The inventive embodiments of the method and radio access node allows for escalating a page to a larger intermediate set of cells, whilst maintaining a moderate paging load in the network. In an embodiment of the invention implemented in a LTE network, the method and an eNodeB configured to perform the method, provides for an escalated page to a set of cells handled by a plurality of radio access nodes without escalating the page to a full Tracking Area; thereby reducing the overall load from paging in the network, thus, providing the advantage of reduced signaling load during paging in the LTE network and improved page response time.

DETAILED DESCRIPTION

Figure 1:
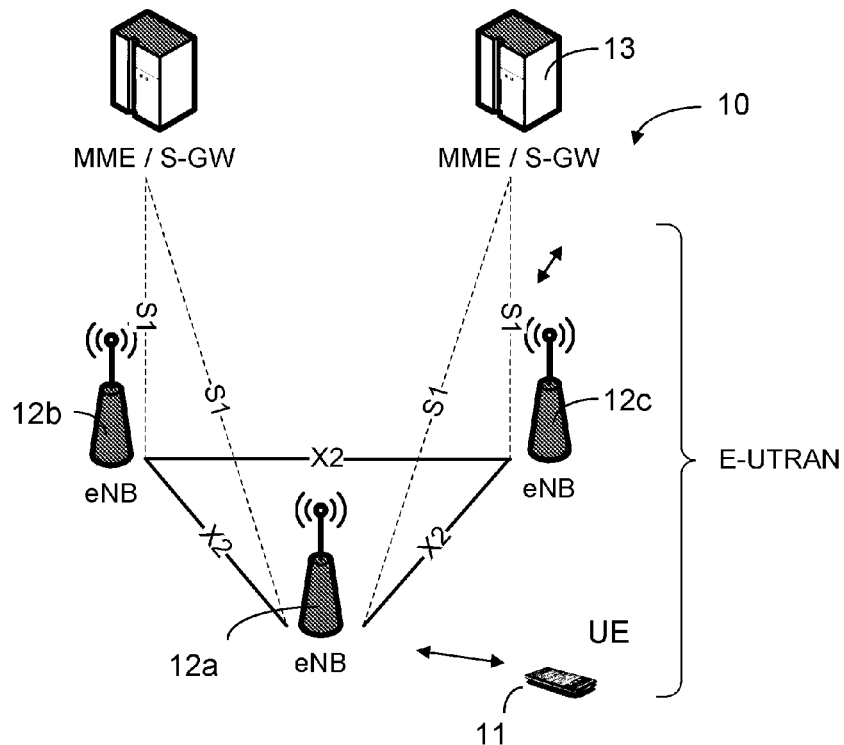
FIG. 1 is a schematic view of an exemplary LTE network.

FIG. 1 shows a schematic view of an exemplary E-UTRAN/LTE network 10, wherein the invention may be implemented. As can be seen in FIG. 1, each eNodeB 12a, b, c is connected to the Serving Gateway, S-GW, and the Mobility Management Entity, MME, 13 by means of the S1 interface. eNodeBs 12a, b, c are connected to one another over the X2 interface.

Figure 2:
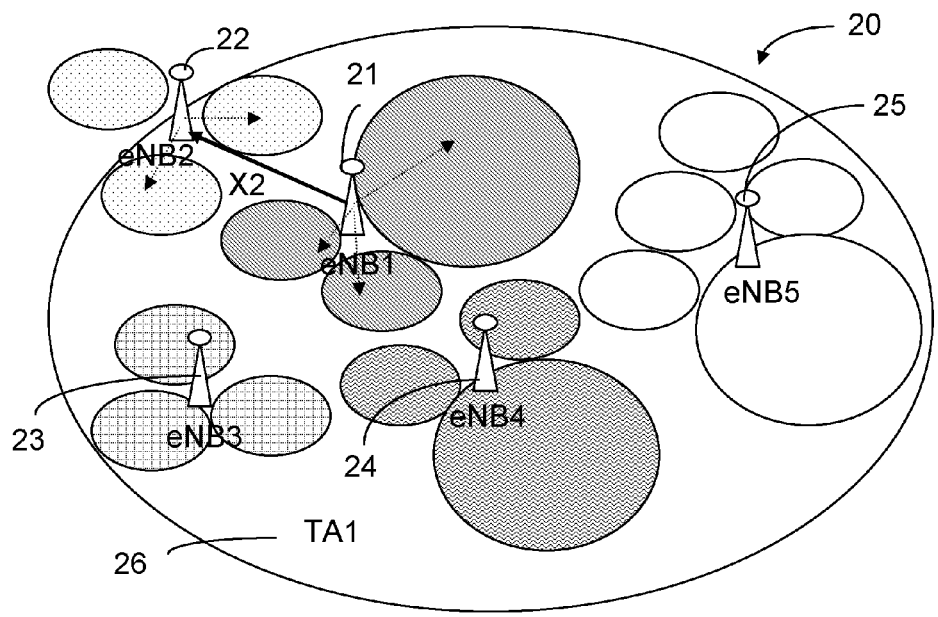
FIG. 2 is a schematic view of a Tracking Area.

FIG. 2 is a schematic view of a Tracking Area in a LTE network including a first radio access node 21, and four neighboring radio access nodes 22-25 and wherein each radio access node is an eNodeB, eNB, in the LTE network. Each eNodeB, eNB1-eNB5, is responsible for radio-related functions in adjacent cells, wherein cells served by the same eNodeB are illustrated by identical filling patterns in the schematic view. In the schematic view, each eNodeB is visualized as a physical entity with a single antenna. However, an eNodeB is a logical node that may be implemented through one or more physical radio base stations.

Figure 3:
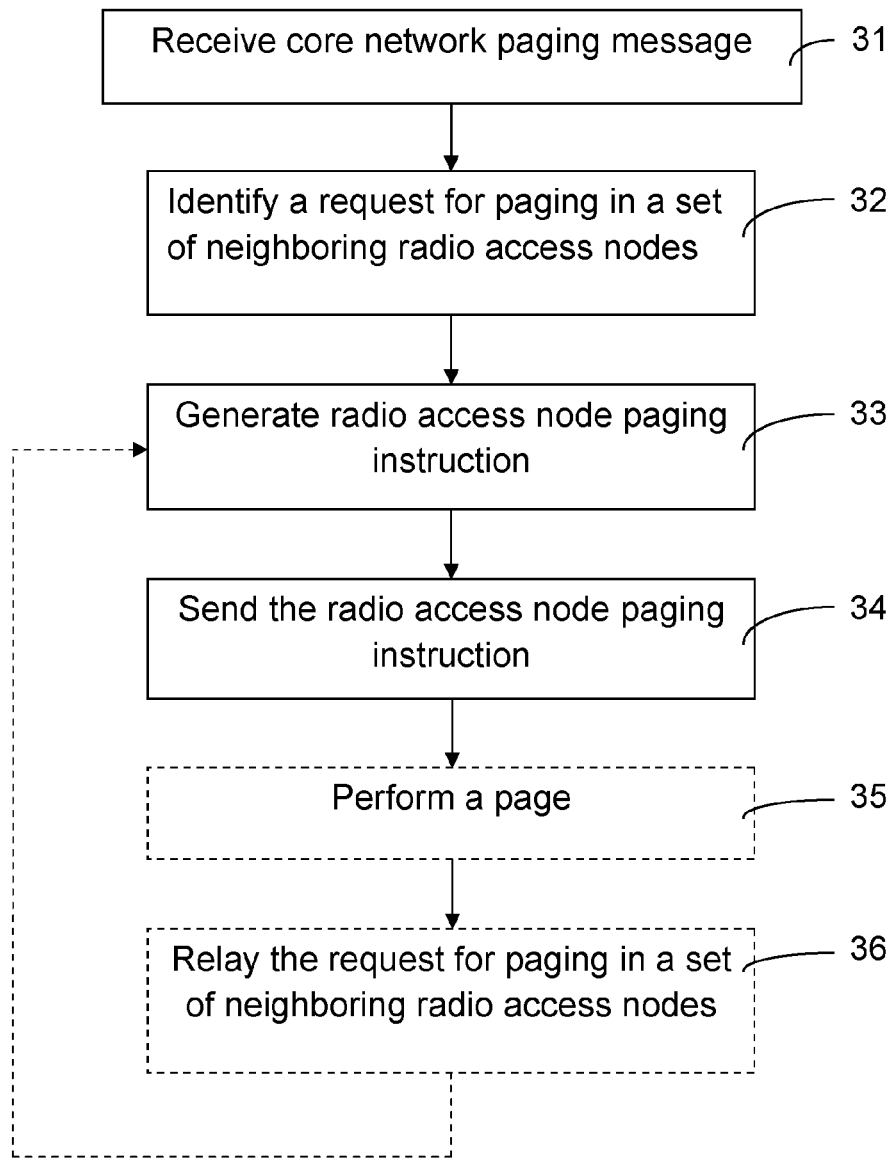
FIG. 3 is a flowchart illustrating an embodiment of method steps.

FIG. 3 discloses a basic, representative, non-limiting flow chart including steps that may be performed in an exemplary embodiment of the invention. The steps illustrated with dashed lines and boxes, are optional steps that may be included when carrying out the disclosed embodiment. The method steps are performed in a radio access node, e.g., an eNodeB, in a radio access network. The disclosed exemplary embodiment illustrates an embodiment of a method for paging user equipment, UE, in the radio access network.

In a first step 31 a radio access node, e.g an eNodeB, receives a paging message from a core network entity, e.g., a Mobility Management Entity, MME. When performing the embodiment of the inventive method in a LTE network as exemplified in FIG. 1, a S1 Paging message is sent from the MME to the eNodeB to request paging of a certain user equipment, UE. In the following description, the embodiments of the invention are explained in a LTE network with an S1 interface and S1 application protocol, S1-AP, and an X2 interface and X2 application protocol, X2-AP, signaling. However, the invention is not limited to the use of any of these application protocols or interfaces, but may also be performed in a radio access node communicating with a core network entity over any other interface and by means of any other application protocol. Similarly, signaling may also be performed over other suitable interfaces and by means of other application protocol then the X2 interface/application protocol assumed in the exemplifying embodiments of this invention.

Paging for user equipment in LTE is performed in multiple stages in an escalating fashion, starting on eNodeB level and escalating to Tracking Area, TA, level and finally to TA list level. During the first stage in a paging procedure, paging for the user equipment is performed in cells in the eNodeB in which the MME knows the UE to have been present last. If there is no response from the UE within a predetermined time period, the page is extended to further cells.

In the disclosed embodiment of the inventive method, the receiving radio access node identifies a request for paging in a set of neighboring radio access nodes in step 32. Such a request could be included in a subsequent stage of a multi-stage paging procedure, following the first paging stage. A paging level indicating such a request could also be included in the paging message sent from the MME to the eNodeB in step 31. In an embodiment of the invention, the core network paging message is a S1-AP message, but other protocols for communication between a core network and a radio access node are also within the scope of the invention. The step of identifying a request for paging in a set of neighboring radio access nodes may be implemented by identifying and acknowledging a specific paging level, such as a Radio Access Network, RAN, policy level. Other solutions for identifying a request for paging in a set of neighboring radio access nodes are also within the scope of the invention.

When the paging level is identified to be a RAN policy level, the RAN is allowed to apply its own policy regarding in which cells the page shall be sent in from a selection of cells belonging to neighboring radio access nodes, i.e., the node identifying a request for paging in a set of radio access nodes will base the selection of cells to page on its own policy for making such a choice. In embodiments of the method, the radio access nodes are eNodeBs in a LTE network. However, the method is also applicable in other types of networks involving a set up with a radio access network and a core network, wherein the core network initiates paging of user equipment in the radio access network.

In a consecutive step, step 33, a radio access node paging instruction is generated. The step of generating this radio access node may include the activity of selecting which neighboring radio access nodes or cells belonging to neighboring radio access nodes that should be included in the extended RAN policy page. However, the selection on what neighboring radio access nodes or cells belonging to neighboring access nodes may also have been defined previously in the RAN. In such a case the step involves verifying which neighboring radio access nodes, eNodeBs, to involve in the escalated page and generating a paging instruction to be sent to these neighboring radio access nodes.

The policy in the radio access node, eNodeB, for selecting which neighboring eNodeBs or cells belonging to neighboring eNodeBs to select could depend on a variety of traffic information, e.g., traffic related statistics:

In one embodiment of the invention, the selection of neighboring radio access nodes and cells in neighboring radio access nodes could be based on handover statistics. A page instruction is sent to neighboring radio access nodes including cells to which most handovers are performed.

In another embodiment of the invention, the selection of neighboring radio access nodes and cells in neighboring radio access nodes is based on paging statistics. A paging instruction is sent to neighboring radio access nodes instructing the neighboring radio access node to page the UE in cells with the highest page response statistics.

In a further embodiment of the invention, the selection of neighboring radio access nodes and cells in neighboring radio access nodes is based on reestablishment statistics. A page instruction is sent to neighboring radio access nodes including cells from which most reestablishments arrive, instructing the neighboring radio access nodes to perform a page in these cells.

In an embodiment of the invention the selection of neighboring radio access nodes and cells in neighboring radio access nodes is based on load statistics, wherein the neighboring radio access nodes are instructed to page the user equipment in cells with the highest load statistics.

Determination of neighboring radio access nodes and cells within radio access nodes to which the page instruction should be directed, may also be based on any combination of the above statistics or other suitable information relating to traffic load and UE moving patterns.

In step 34, the radio access node paging instruction is sent to selected neighboring radio access nodes. In an embodiment of the invention, the paging instruction from the radio access node receiving the core network paging message to the neighboring radio access nodes is an X2-AP message, specific for the new paging procedure. Such a message could of course also be sent by another suitable protocol used in the radio access network for enabling communication between radio access nodes.

Following receipt of the paging instruction, the receiving radio access nodes will conduct a page as defined in the paging instruction, immediately following receipt of the page instruction or at a given point in time as defined in the page instruction. The paging instruction could include a set of cells to which the page should be directed, but could also request paging of all cells belonging to the receiving radio access node.

In an embodiment of the invention, the radio access node receiving a request for paging in a set of neighboring radio access nodes may relay this request to one of the neighboring radio access node, as illustrated by step 36. Relaying of the responsibility for radio access node paging is performed following an unsuccessful page in the set of radio access nodes neighboring the radio access node receiving the request for paging or when relaying is permitted by the radio access node receiving the request for paging the a set of neighboring radio access nodes. Relaying of the radio access node paging instruction is communicated by an X2-AP message sent from the radio access node originally responsible for performing paging in neighboring radio access nodes. Relaying may be performed in multiple steps, further forwarding the paging instructions to radio access nodes in a one way direction from the radio access node originally responsible for performing paging in neighboring radio access nodes. In the multiple step procedure, relaying may not be performed in such a manner that the ability to generate paging instructions to neighboring radio access nodes is returned to a node previously having been involved in a radio access node paging procedure. The number of paging steps allowed in this relaying procedure may be predetermined by the operator, but may also be dynamically determined during the paging procedure based on statistics in the radio access network. To ensure the one way directivity in the relaying of the paging instruction, a paging identity could be included in the X2-AP paging message. When a radio access node receives a paging instruction that has previously been sent from the same radio access node, the receiving radio access node will ignore the page instruction.

In an embodiment of the invention, the radio access node receiving the paging message from the core network and sending the radio access node paging instruction, will perform a page as illustrated in step 35 in the cells of radio access node, thus repeating the page in these cells, since a first page has already been performed in the first stage of the multi stage paging procedure prior to escalating the page to a RAN policy level.

The disclosed intermediate escalation of a page into a larger area than one radio access nod, but smaller than the Tracking area representing the previous next paging level in the LTE network, is performed by the radio access network. The paging message from the core network includes the paging level information, and a time-out period is set in the core network for determining when to escalate a page to a next paging level following the non-receipt of page response from the paged UE. Paging may be repeated on each paging level according to predefined settings in the network. These settings may be operator defined.

In another, not illustrated, embodiment of the invention, the set of neighboring radio access nodes to which the page is escalated consists of only one neighboring radio access node. However, other embodiments foresee the selection of neighboring radio access nodes as a subset to a tracking area or as a subset to a tracking area list. The choice of neighboring radio access nodes to include in the escalated page is based on a neighbor relationship between the radio access node sending the paging instruction and the neighboring radio access node, wherein a neighbor relationship is considered to exist between any radio access nodes having a radio access node interface with one another, e.g., the X2 interface.

Figure 4:
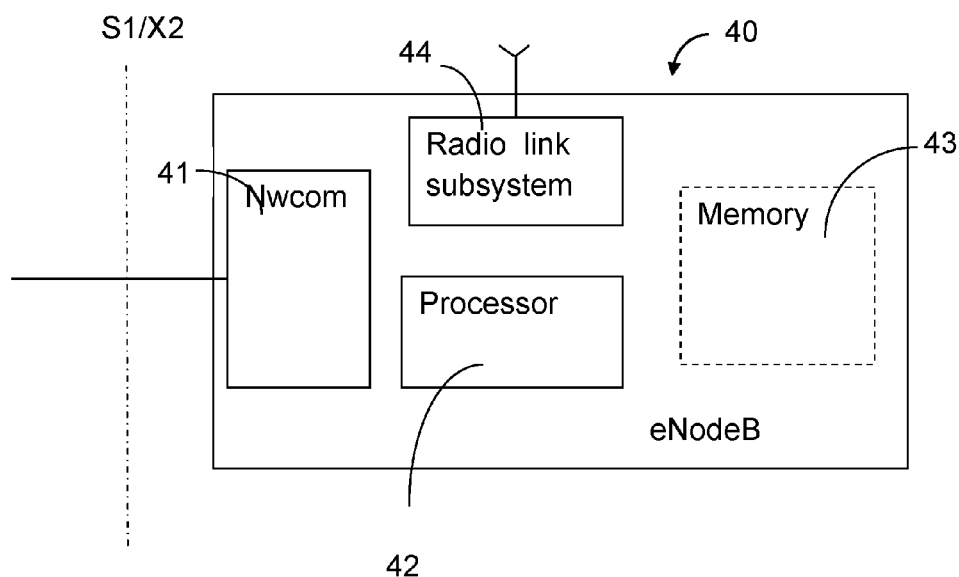
FIG. 4 is a block diagram of a radio access node according to an embodiment of the invention.

The invention also relates to a radio access node as illustrated in FIG. 4. The radio access node 40 is configured to cooperate with a set of neighboring radio access nodes in a paging procedure in a radio access network. The radio access node comprises a core network communication unit 41 having S1 and X2 interface to the core network and neighboring eNodeBs. The radio access node is configured to communicate with the core network over a S1 application protocol and neighboring radio access nodes over the X2 application protocol. The network communication unit 41 receives paging messages from the core network or neighboring radio access nodes. The radio access node further comprises a processor 42, wherein the paging messages are processed to determine a request for paging in a set of neighboring radio access node. Such a request could be in the form of paging level information included in the paging message from the core network or from a relaying neighboring radio access node. The processor 42 could also include means to generate a paging instruction based on the paging message and statistics relating to traffic or UE movements in the network. A memory 43 in the radio access node is configured to store information on the radio access node policy for paging of neighboring radio access node. The network communication unit 41 receives and/or transmits the radio access paging instruction to a set of neighboring radio access nodes by means of a radio access node interface, e.g., the X2 interface. The block diagram illustration of the core network transceiver is a simplified illustration of an embodiment of a radio access node according to the invention. The radio access nodes naturally also include conventional radio access node means performing the radio access node functions of a conventional radio access node. A radio link subsystem 44 in the radio access node is configured for radio communication with user equipment in at least one cell of the radio access node.

FIG. 2 illustrates a situation wherein a radio access node 21 receiving a paging message escalates a subsequent page to two of the cells in a neighboring radio access node. In the situation illustrated in FIG. 2, the last known radio access node, is represented as eNB1. The eNB1 21 sends a page in all cells handled by the eNB1. The paging signals are illustrated as dashed arrows from the eNB1 to the respective cell. A paging instruction is sent via the X2 application protocol to one of the neighboring radio access nodes 22, eNB2, instructing the eNB2 22 to escalate the page to two of the cells handled by eNB2. The paging signals are illustrated as dashed arrows from eNB2 to the respective cells.

Figure 5:
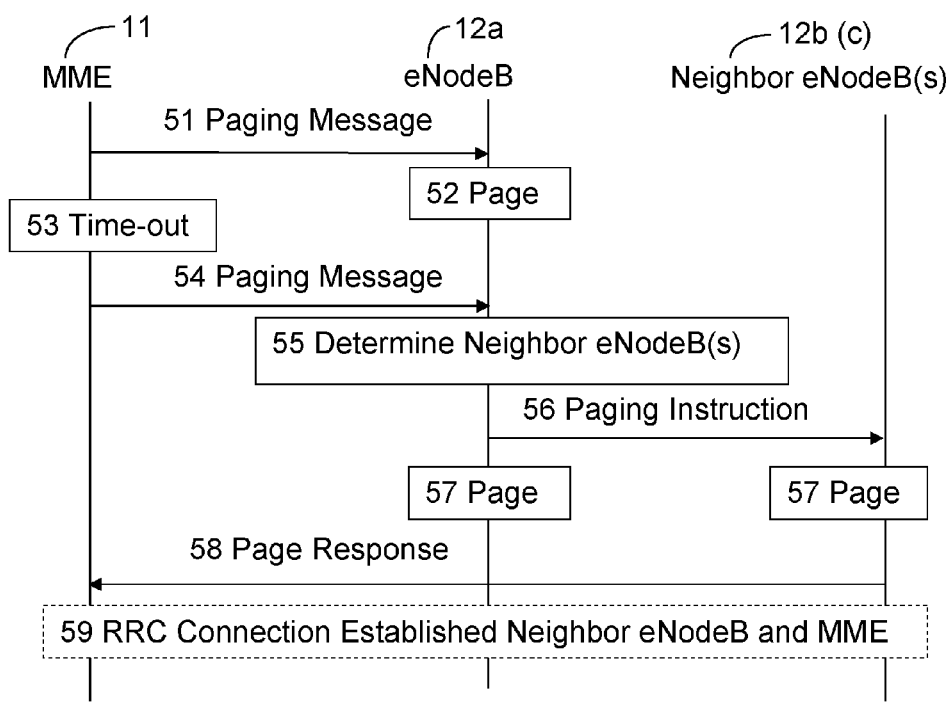
FIG. 5 is a signaling diagram illustrating exchange of signals in an embodiment of a network interface.

FIG. 5 illustrates a signaling sequence for a first and a second stage of a multi-stage paging sequence including an escalated page according to an embodiment of the invention. The signaling sequence is exemplified for a LTE network, wherein one or more requests for paging included in a paging message and here illustrated as paging message 51, are sent from a Mobility Management Entity, MME 11 in the core network. The paging message 51 is received in a radio access node 12a, which in the disclosed embodiment of the invention is represented by an eNodeB 12a. The MME 11 could be substituted by core network entities performing the task of sending a paging message, similarly the eNodeBs 12a, b, c could be replace by other radio access nodes when the invention is embodied in a other network configurations than an LTE network.

In FIG. 5, the MME sends a paging message 51 to the eNodeB 12a, where the paged UE was last known to have been. The paging message 51 may include information on paging level in the paging message, defining the paging level as an eNodeB paging level. However, paging may also be performed without such paging information. The eNodeB receiving the paging message will perform paging in all the cells managed by the eNodeB by transmitting a page 52. If the UE is no longer present in the cells managed by the eNodeB 12a, a time-out 53 will occur in the MME 11 indicating that the MME 11 needs to move to a next stage in the multi-stage paging procedure. In the second stage, the MME 11 sends a new paging message 54 to the eNodeB receiving the previous paging message 51. When the paging level is escalated from the first to the second paging level, a request for paging in a set of neighboring radio access nodes must be included in the paging message. In the disclosed embodiment, this request is included as paging level information in the paging message 54. The receiving eNodeB 12a processes the paging level information to determine that a RAN policy level is applicable for this stage of the paging. The eNodeB continues to determine a set of neighboring eNodeBs 55 comprising one or more neighboring eNodeBs, to include in an escalated paging stage. A paging instruction 56 is sent to the set of neighboring eNodeBs 12b,c over the eNodeB X2 interface. The eNodeBs 12b, c receiving the paging instruction performs a page 57 as defined in the instruction, i.e., in one or more cells specified in the paging instruction. In the embodiment of the invention disclosed in the signaling sequence in FIG. 5, the UE subject to paging is assumed to be present in one of the cells handled by the neighboring eNodeB. Following a response from the paged UE, the neighboring eNodeB 12b/c serving the cell where the UE is found to be present, sends a page response 58 to the MME 11. The multi-stage paging procedure is concluded and a Radio Resource Control, RRC, connection 59 is established between the MME 11 and the neighboring eNodeB 12b/c.

In a situation not disclosed in FIG. 5, wherein a time-out occurs during the escalated paging stage, the MME will escalated the paging area to a third stage and include all eNodeBs belonging to a Tracking Area in the third stage. In a fourth stage, and final stage of the paging procedure, the paging will involve all eNodeBs being part of a Tracking Area List.

In the signaling sequence disclosed in FIG. 5, it has been assumed that the multistage paging procedure is initiated with a page to cells handled by the eNodeB wherein the UE was last present. In an alternative embodiment of the invention, the first stage could also be a stage according to a RAN policy level, so that a first page is performed in one or more cells of the eNodeB where the UE was last observed, but also in a set of cells in one or more neighboring eNodeBs. When using traffic and movement related statistics to determined additional cells to page at UE, such a paging procedure involving additional cells already in a first stage of a paging procedure, could increase the ability to receive a prompt page response without significantly adding to the paging load.

The above description provides details on a number of possible embodiments of the invention that are non-limiting to the invention. The embodiments serve as illustration of some of presently preferred embodiments of the invention, but does not determine or limit the scope of the invention. The scope of the present invention also encompasses other embodiments which may become obvious to those skilled in the art, and the scope of the present invention is not to be limited by anything but the appended claims.

The invention claimed is:

1. A method, in a radio access node in a radio access network, for paging a user equipment in the radio access network, the method comprising:
   receiving, by the radio access node, a core network paging message for paging the user equipment from a core network node;
   identifying, by the radio access node, a request for escalating paging of the user equipment in a set of neighboring radio access nodes of the radio access node using paging level information received by the radio access node from the core network node in the core network paging message, wherein the paging level information indicates that an escalated page of the user equipment is to be performed;
   generating, by the radio access node, a radio access node paging instruction, for the set of neighboring radio access nodes, including an escalated page instruction based on the paging level information received by the radio access node from the core network node in the core network paging message; and sending, by the radio access node, the radio access node paging instruction to the set of neighboring radio access nodes of the radio access node, whereupon a page of the user equipment is performed in at least one cell of each neighboring radio access node in the set of neighboring radio access nodes.

2. The method of claim 1, wherein the method further comprises performing, by the radio access node, a first page in all cells of the radio access node.

3. The method of claim 1, further comprising relaying, by the radio access node, the request for escalating paging in a further set of neighboring radio access nodes to a further radio access node belonging to the set of neighboring radio access nodes of the radio access node and repeating, by the further radio access node, the steps of generating a radio access node paging instruction and sending the radio access node paging instruction to the further set of neighboring radio access nodes of the further radio access node, whereupon a page is performed in at least one cell of each neighboring radio access node in the further set of neighboring radio access nodes.

4. The method of claim 3, wherein relaying, by the radio access node, to a further radio access node is repeated a predetermined amount of times.

5. The method of claim 1, wherein the core network paging message is an S1 application protocol (S1-AP) message.

6. The method of claim 1, wherein the radio access node paging instruction is an X2 application protocol (X2-AP) paging instruction and the radio access node is an eNodeB.

7. The method of claim 6, wherein the X2-AP paging instruction is sent to the set of neighboring radio access nodes including a set of cells to which most handovers are performed.

8. The method of claim 6, wherein the X2-AP paging instruction is sent to the set of neighboring radio access nodes including a set of cells with the highest page response ratio.

9. The method of claim 6, wherein the X2-AP paging instruction is sent to the set of neighboring radio access nodes including a set of cells from which most reestablishments arrive.

10. The method of claim 6, wherein the X2-AP paging instruction is sent to the set of neighboring radio access nodes including a set of cells with the highest load statistics.

11. The method of claim 1, wherein the escalated page instruction includes a request for paging of the user equipment in a set of cells belonging to the set of neighboring radio access nodes and is arranged to initiate the escalated page in the set of cells.

12. The method of claim 11, wherein the set of cells belonging to the set of neighboring radio access nodes correspond to all cells belonging to the set of neighboring radio access nodes.

13. The method of claim 11, wherein radio access network statistics are used to determine the set of cells in which to perform the escalated page.

14. A radio access node configured to cooperate with a set of neighboring radio access nodes in a paging procedure of a user equipment in a radio access network, the radio access node comprising:

a network communication circuit configured to receive a core network paging message for paging the user equipment from a core network node and to transmit radio access node paging instructions to the set of neighboring radio access nodes;

a processor configured to process the received core network paging message to identify a request for escalating paging of the user equipment in the set of neighboring radio access nodes of the radio access node using paging level information received by the network communication circuit of the radio access node from the core network node in the core network paging message and to form a radio access node paging instruction, for the set of neighboring radio access nodes of the radio access node, including an escalated page instruction based on the paging level information received by the network communication circuit of the radio access node from the core network node in the core network paging message, wherein the paging level information indicates that an escalated page of the user equipment is to be performed; and at least one radio link subsystem configured for radio communication with the user equipment in at least one cell of the radio access node.

15. The radio access node of claim 14, further including a memory configured to store the radio access node paging instructions predetermined in the radio access node.

* * * * *